United States Patent [19]

O'Brien

[11] Patent Number: 4,987,528
[45] Date of Patent: Jan. 22, 1991

[54] SIGNATURE ANALYSIS CONTROL SYSTEM FOR A STAMPING PRESS

[75] Inventor: Michael J. O'Brien, Carrollton, Tex.

[73] Assignee: Johnson Service Company, Milwaukee, Wis.

[21] Appl. No.: 442,421

[22] Filed: Nov. 21, 1989

Related U.S. Application Data

[63] Continuation of Ser. No. 167,371, Mar. 14, 1988, abandoned.

[51] Int. Cl.$^5$ .................. G06F 15/46; G01H 7/68; G05B 9/02
[52] U.S. Cl. ........................... 364/184; 364/476; 364/508
[58] Field of Search ............. 364/476, 477, 506, 508, 364/518, 184; 73/862.06, 862.53, 862.54, 862.55

[56] References Cited

U.S. PATENT DOCUMENTS

| 3,811,040 | 5/1974 | Weinfurt et al. | 364/518 |
|---|---|---|---|
| 4,481,589 | 11/1984 | McGowan et al. | 364/474 |
| 4,504,920 | 3/1985 | Mickowski | 364/550 |
| 4,519,040 | 5/1985 | Brankamp et al. | 364/474 |
| 4,523,483 | 6/1985 | Brankamp et al. | 73/862.54 |
| 4,527,272 | 7/1985 | Reiney | 371/25 |
| 4,536,849 | 8/1985 | Borisch et al. | 364/550 |
| 4,570,229 | 2/1986 | Breen et al. | 364/476 |
| 4,633,720 | 1/1986 | Dybel et al. | 364/476 |
| 4,695,965 | 9/1987 | Fujita et al. | 364/518 |
| 4,699,239 | 10/1987 | Williams | 364/476 |
| 4,712,405 | 12/1987 | Crout et al. | 364/476 |
| 4,734,869 | 3/1988 | Mickowski | 364/476 |
| 4,750,131 | 6/1988 | Martinez | 364/506 |
| 4,766,758 | 8/1988 | Lucas et al. | 73/862.54 |

OTHER PUBLICATIONS

IDC Corporation, Press Load Monitor Brochure.
TM88 Series Tonnage Monitor, author unknown, 3/18/88.

Primary Examiner—Jerry Smith
Assistant Examiner—Jim Trammell
Attorney, Agent, or Firm—Foley & Lardner

[57] ABSTRACT

A signature analysis control system for a stamping press is disclosed which does not require a multiplicity of sensors or reconfiguration upon changing the die. An upper and lower reference signature corresponding to desired force values at particular sampling points during the ram cycle is developed based on a known good sample signature. The force signature for successive cycles of the press is then compared to the upper and lower reference signatures, and the press is inhibited in the event that any sampling point deviates from the corresponding point in the reference signatures.

22 Claims, 5 Drawing Sheets

SIGNATURE ANALYSIS CONTROL SYSTEM FOR A STAMPING PRESS

This is a continuation of application Ser. No. 167,371 filed Mar. 14, 1988, abandoned.

FIELD OF THE INVENTION

The present invention relates to control systems for a stamping press and, in particular, to control systems which disable a press in the event of unacceptable force variations.

BACKGROUND OF THE INVENTION

The term "signature analysis" has been employed in connection with test and quality control systems where respective specific characteristics, i.e., a signature, of a test piece are measured and compared to predetermined expected (reference) values. For example, a "signature analysis" system for testing printed circuits is described in U.S. Pat. No. 4,527,272 issued on July 2, 1985 to M. G. Reiney. Signal measurements are taken at a plurality of test points on the circuit board test piece and each compared to expected signal values.

In a stamping press, respective upper and lower portions of a die are forced together to effect various stamping operations, such as forming, cutting, coining, bending, punching or drawing, on a workpiece, typically sheet metal, disposed between the die portions.

Systems for monitoring the force exerted during the stamping process are, in general, known. For example, various commercially available systems employ sensors fitted into respective support members of the press frame for visual display of the force curves as a setup aid (to equalize force on the respective support members). Some such systems also generate an alarm or disable the press in the event that the total forming tonnage (maximum force exerted by the press) exceeds a predetermined level. An example of such system is the Load Guard, marketed by Helm Instruments. However, dies typically include a relatively large number of individual stations for performing the various forming operations and such systems do not provide information regarding the specific portion of the die at which the problem occurs.

It has been proposed to dispose sensors on a stamping die to monitor individual "critical stations" on the die and disable the press in the event of an unacceptable force variation associated with a specific forming operation. Total press load (on respective supports) is also monitored and displayed as a function of time to aid in setup (balancing for die) and for selecting optimal points of control, i.e., identifying "critical stations." (See "In-Process Control Can also be Used on Stamping Presses," *Brankamp Journal* in November, 1987.) However, since most dies include a relatively large number of forming operations, such systems tend to require a prohibitively large multiplicity of sensors. In addition, the system must be reconfigured, and disposition of sensors re-effected, each time the dies are changed.

SUMMARY OF THE INVENTION

The present invention provides a control system which does not require a multiplicity of sensors or reconfiguration upon changing the die. Specifically, a reference signature corresponding to desired force values at particular sampling points during the ram cycle is developed. The force signature for successive cycles of the press is then compared to the reference signature, and the press inhibited in the event that any sampling point deviates from the corresponding point in the reference signature by more than predetermined limits.

BRIEF DESCRIPTION OF THE PREFERRED EXEMPLARY EMBODIMENT

A preferred exemplary embodiment of the present invention will hereinafter be described in conjunction with the appended drawing, wherein like designations denote like elements and:

In FIGS. 2 and 3, a shorthand convention has been adopted, whereby:
the symbol "[ ]" means "the contents of"; and
the symbol " " means "loaded into." For example,
"[BUF (i)] CURVE (i)" means the contents of location i of array BUF are loaded into location i of array CURVE.

DETAILED DESCRIPTION OF A PREFERRED EXEMPLARY EMBODIMENT

Figure 1:
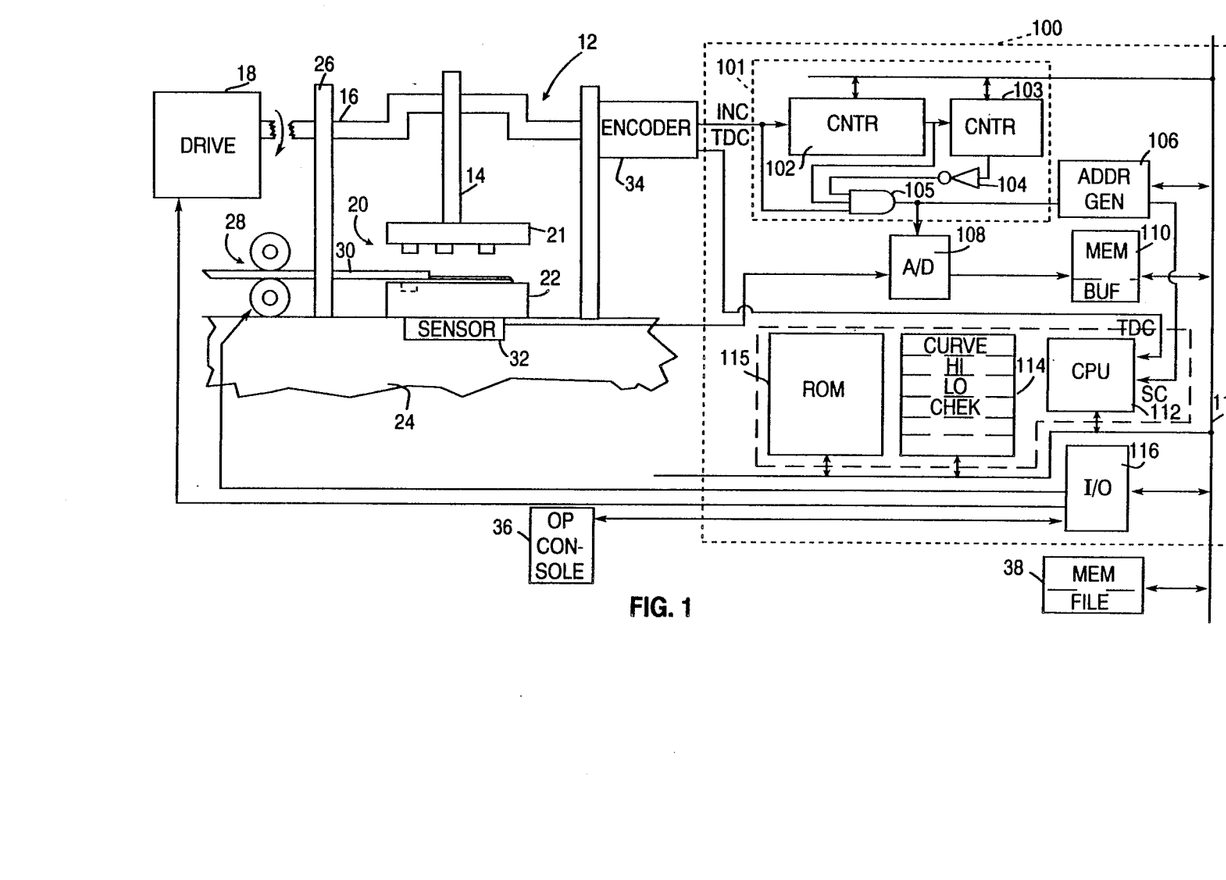
FIG. 1 is a schematic block diagram of a press system.

Referring now to FIG. 1, a stamping press control system 10 in accordance with the present invention includes a conventional press 12, at least one force sensor 32, a mechanism for generating indicia of the phase of press operation, such as an encoder 34, and a signature analysis control system 100.

Press 12 suitably includes a piston ram 14, a rotatable shaft 16, suitably cranked or cammed, a die 20 having corresponding upper and lower portions 21 and 22, a suitable bolster (base) 24, and respective support members 26. Support members 26 extend upwardly from bolster 24 to maintain the axis of shaft 16 at a predetermined distance from bolster 24. Shaft 16 is driven by a conventional drive mechanism, generally indicated as 18, including an electrically actuated clutch or other control mechanism. Ram 14 is operatively coupled at one end to rotating shaft 16. The other end of ram 14 bears upper portion 21 of die 20. Lower portion 22 of die 20 is disposed on base 24. A sheet material 30, (e.g., roll steel) is disposed between the die portions.

As shaft 16 rotates, ram 14 cyclically moves through a stroke, during which upper portions 21, of die 20 is moved toward lower portion 22, interacting with material 30, and is then separated. The minimum distance between die portions 21 and 22 is regulated to provide a desired working force on sheet material 30. As is well known in the art, die 20 includes a multiplicity of individual stations for forming individual forming operations, such as cutting, coining, bending, or drawing.

A suitable feeder mechanism, generally indicated as 28, incrementally advances sheet material 30 along a path between die portions 21 and 22 in synchronism such that various portions of the sheet metal are operated upon by various stations of die 20 in sequence. Feeder mechanism 28, suitably a roll feeder, suitably advances sheet 30 by one increment per cycle during the portion of each cycle when die portions 21 and 22 are separated. Positioning of 30 is preferably completed at a point in the cycle which will permit press 12 to be disabled in the event of a misfeed prior to interaction with sheet 30 in the next cycle.

Sensor 32 is disposed on press 12 to generate an analog signal (hereinafter sometimes referred to as the "force signal") indicative of the force total tonnage generated by ram 14 over the course of the ram cycle. Sensor 32 may be for example: a conventional strain gauge, such as a Wintress-Data Instrument WLA1000SL strain gauge; an accelerometer, such as a PCB303A02 accelerometer; or a piezo-electric transducer, such as a Penwalt Corporation Model SDT3028K KYNAR piezo film sensor. It has been determined that the relative disposition of sensor 32 on press 12 is not critical. For example, depending upon the nature of the sensor, sensor 32 may be disposed beneath die 22, on ram 14, or on support members 26.

Encoder 34 is operatively coupled to shaft 16 to generate signals indicative of incremental advancement of shaft 16, and thus ram 14, through the ram cycle, i.e., the phase of the ram cycle. More specifically, encoder 34 suitably generates a top dead center pulse (TDC) indicative of the nominal beginning of the cycle (e.g., with die 20 in a full open position) and incremental advancement (INC) pulses generated in response to rotation of shaft 16 through a predetermined number of degrees. Encoder 34 suitably comprises a Hewlett-Packard incremental encoder. Where encoder 34 generates quadrature incremental signals, such signals may be combined, as is conventional in the art.

The force signal from sensor 32 and timing (phase) signals from encoder 34 are applied to control system 100. In general, control system 100 periodically samples the force signal as a function of ram position (phase), stores sequential samples to generate a force signature of a relevant portion of the ram cycle (e.g., during which the die interacts with material 30), compares the force signature to a reference signature, and detects out-of-tolerance conditions. These force samples are correlated directly with respect to ram position. Upon detection of out-of-tolerance conditions, an alarm is generated and, if desired, press 12 stopped. The force signature and indicia of the out-of-tolerance points in the signature are also stored and displayed for analysis.

It has been determined that the phase of the ram cycle does not vary linearly with time; the rate of change of ram position tends to vary in accordance with the resistance encountered from sheet metal 30. Variations in phase-time relationship from cycle to cycle may occur due to, for example, deviations in the thickness of material 30 or in drive speed, or damage to the die. Accordingly, to ensure that the signatures are repeatable, sampling is correlated directly with respect to ram position (phase), i.e., in accordance with signals from encoder 34, rather than as a function of time, or are otherwise correlated with the phase.

Control system 100 suitably comprises: appropriate timing-gate logic 101; an analog-to-digital (A-D) converter 108; a random access buffer memory 110 and cooperating address generator 106; a microprocessor 111 including a processing unit (CPU) 112, (e.g., MC68000), a random access memory 114 (e.g., 512 KB) and a read-only memory 115 (e.g., 16 KB); suitable input/output interfacing circuitry 116, and a conventional bus 118. Input/output interfacing circuitry 116 suitably includes conventional digital input/output (I/O) and communicating interfaces. Digital I/O interfaces provide control signals to, e.g., drive 18, feeder 28, and/or other portions of press 12, as appropriate. A conventional communications interface, such as an RS-232 interface, facilitates communication with various external devices, such as, e.g., an operator's console 36. Bus 118 provides selective communication between the various elements of control system 100, and various external devices such as, for example, a mass memory 38, and a central supervisory computer (not shown in FIG. 1).

Timing-gating logic 101 provides suitable clock signals to the other elements of system 100 during a designated portion of the ram cycle, e.g., the portion of the ram cycle during which the respective halves 21, 22 of die 20 interact with sheet metal 30. Timing logic 101 may be implemented by conventional techniques. For example, timing-gating logic 101 may comprise respective programmable counters 102 and 103, an inverter 104, and a three-input AND GATE 105. Counters 102 and 103 are pre-loaded, as will be explained, with indicia of the beginning and end of the designated portion of the ram cycle, and, clocked by the incremental advancement (INC) pulses, cooperate with inverter 104 to enable AND GATE 105 with respect to the INC pulses during the designated portion of the ram cycle. In practice logic 101 may be integral to microprocessor 111 with the INC and TDC signals applied to respective interrupts. Alternatively, logic 101 may additionally include respective registers (not shown) associated with counters 102 and 103. The registers are pre-loaded with indicia of beginning and end of the designated ram cycle portion, (e.g., during initialization), and counters 102 and 103 loaded from the registers in response to the TDC pulse from encoder 34. Another suitable implementation of timing logic 101 employs a counter, registers and comparators. The registers are preloaded with indicia of the beginning and end of the relevant portion of the cycles. The counter is reset to zero by the TDC pulse and incremented by the INC pulses, and the comparators generate a gating signal for the duration of period during which the contents of the counter are between the beginning and end counts stored in the registers.

The analog force signals from sensor 32 are applied to A-D converter 108. A-D converter 108, samples the analog signal in response to the timing signals from logic 101. Thus, during the designated portion of the ram cycle, A-D converter 108 generates successive data bytes indicative of the instantaneous values of the force. If desired, suitable amplifier and gain control circuitry (not shown) may be interposed between sensor 32 and A-D converter 108.

The sequential data bytes are stored in the successive locations of an array BUF in memory 110. Memory 110 suitably includes at least one addressable location corresponding to a each increment in the relevant portion of the ram cycle.

Addressing of memory 110 is effected through address generator 106. As will be explained, address generator 106 is set to the beginning address of the BUF array at the beginning of each ram cycle, and is thereafter incremented by the timing signals from logic 101 to step through the BUF array. Address generator 106 may be implemented through conventional techniques. For example, address generator 106 may comprise a programmable counter, incremented by the gated INC signals from logic 101, and periodically set by microprocessor 111 through bus 118. Alternatively, address generator 106 may comprise a register and a counter.

The register is preloaded with the starting address of the BUF array in memory 110. The counter is loaded from the register in response to the TDC pulse from encoder 34 and incremented by the timing signals from logic 101. In practice, address generator 106 may be integral to a commercially available integrated circuit together with microprocessor 111, memory 110, or both. Where address generator 106 is not integral to microprocessor 111, tri-state buffers (not shown) may be included to facilitate data transfer.

For the duration of the designated portion of the cycle, A-D converter 108 is clocked, address generator 106 incremented and read control signals are applied to memory 110 (control lines not shown) to effect storage of the data bytes in sequential locations in the BUF array. When data bytes corresponding to the number (n) of increments in the designated portion of the ram cycle have been installed in memory 110, address generator 106 (or memory 110) generates a signature collected (SC) interrupt to microprocessor 112.

Figure 2:
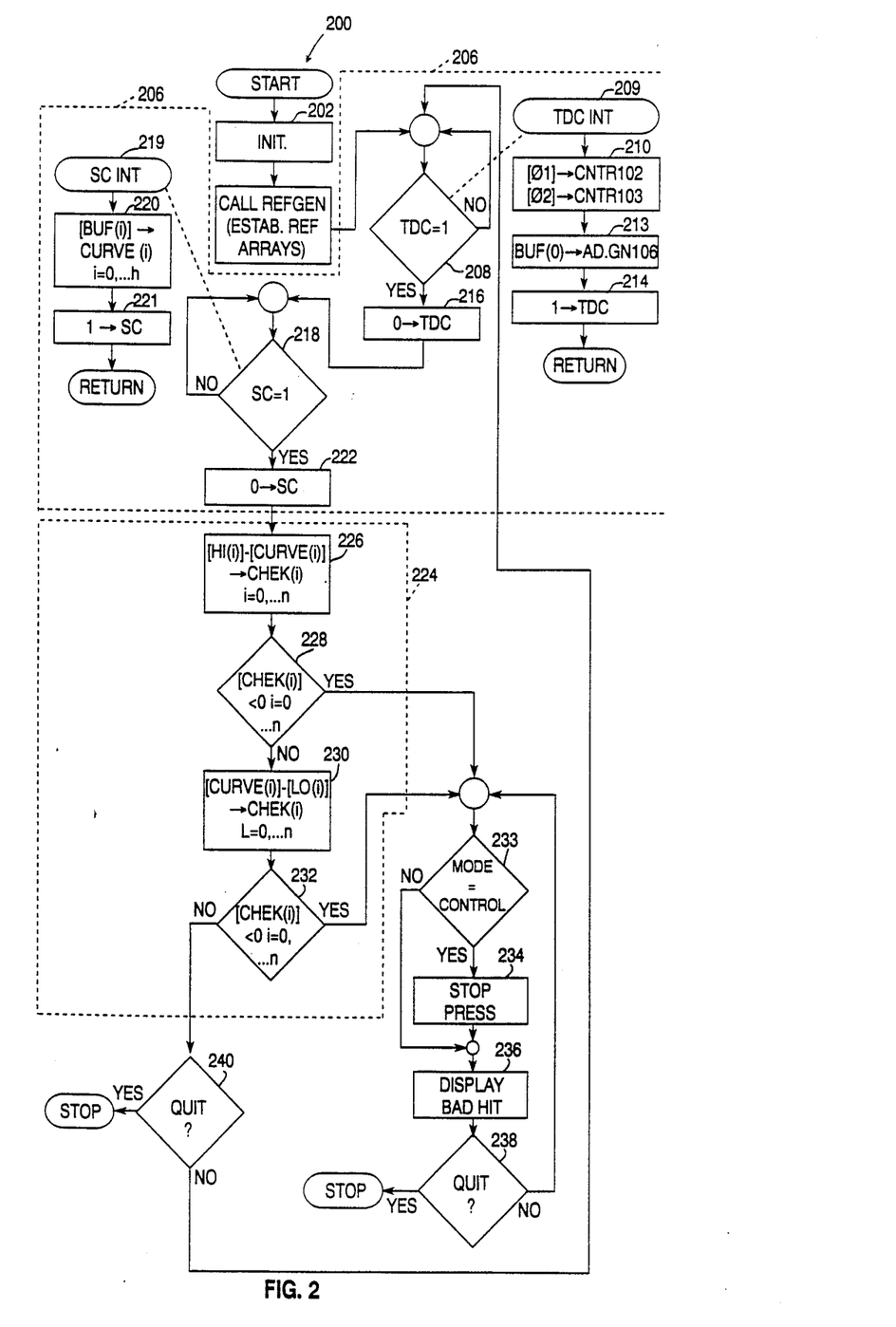
FIG. 2 is a flow chart of the main program executed by system 100.
Figure 3:
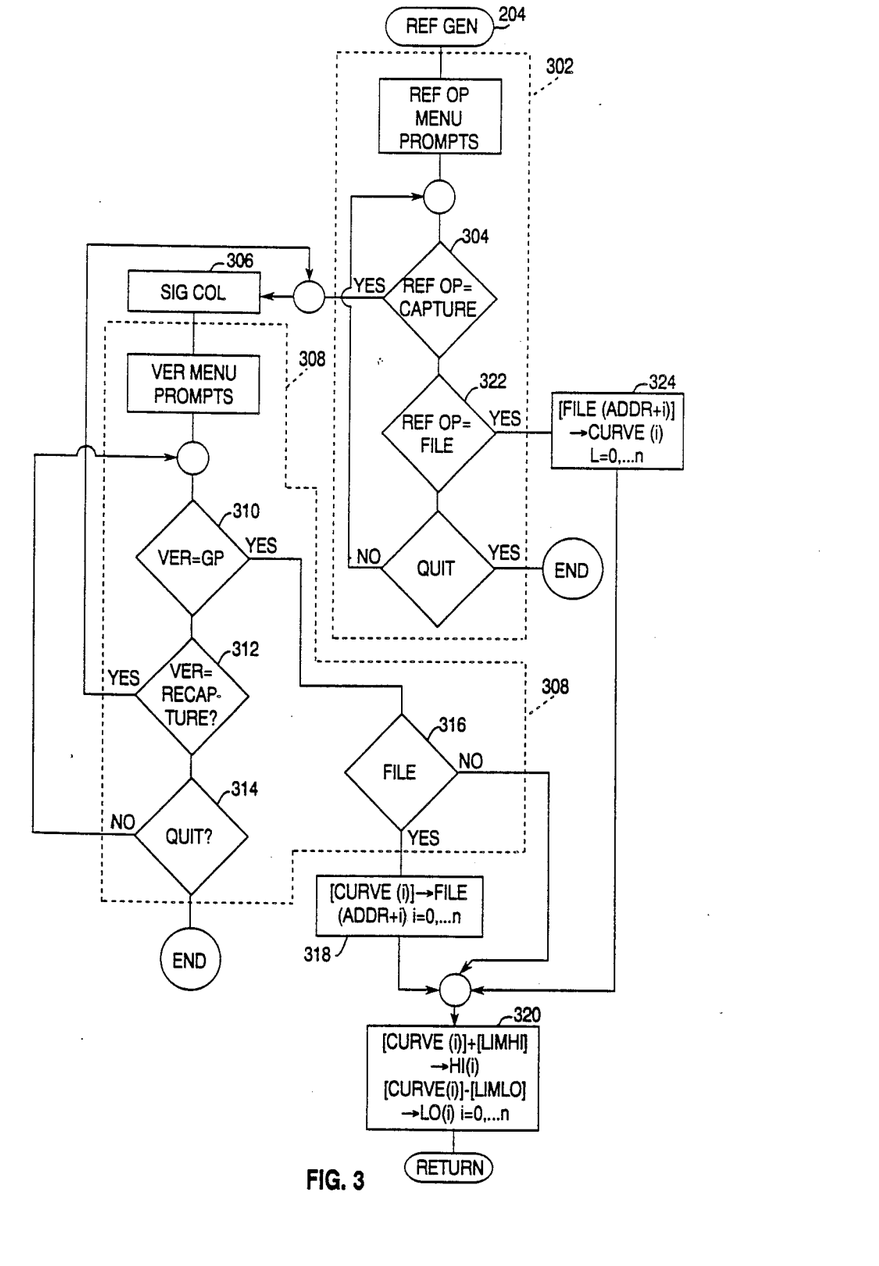
FIG. 3 is a flow chart of a suitable reference generation program.

Referring now to FIGS. 1, 2 and 3, the operation of system 100 will be more fully explained. When system 100 is activated, microprocessor 111 begins execution of a program 200 (FIGS. 2 and 3) resident in ROM 115. Program 200 is suitably interrupt-based, suspending normal progression in a main program to execute respective predetermined sequences of instructions in response to respective interrupts provided to microprocessor 112. For ease of explanation, interrupt routines are illustrated as connected by dotted line to affiliated portions of the main program.

Upon actuation, microprocessor 112 executes a suitable initialization sequence (Step 202). Operator entry of various parameters are elicited through prompts or default values established in a manner well known in the art. For example, the beginning ($\phi 1$) and end ($\phi 2$) of the relevant portion of the ram cycle (and the number of increments (n) in the portion) are established. Similarly, the operator establishes the operational mode of the system: MONITOR, wherein an alarm and display are generated in the event of an out-of-tolerance conditon; or CONTROL, wherein the press is additionally inhibited upon an out-of-tolerance condition. Initial values for respective variables, address and array spaces are also established.

A reference generation sequence is then executed (Step 204). Respective reference arrays, HI and LO, indicative of a reference signature, are installed in random access memory 114 (Step 204). Reference generation sequence 204 will be described in conjunction with FIG. 3.

A signature collection sequence 206 is then effected. In essence, the system waits for a TDC interrupt indicative of the beginning of a ram cycle, followed by a signature collected (SC) interrupt, indicating that a complete signature has been stored in memory 110, then transfers the signature into an array in memory 114 for processing. More specifically, a "TDC wait" loop (Step 208) is entered; the value of a flag TDC, indicative of completion of TDC interrupt routine 204, is repeatedly checked until the TDC flag assumes a value of one. If desired, a timing mechanism can be interjected into the wait loop as a failsafe against failure to complete the TDC interrupt routine.

As previously noted, the top dead center (TDC) pulse from encoder 34, indicative of the nominal beginning of the ram cycle, is applied as an interrupt to microprocessor 112. In response to a top dead center (TDC) interrupt, processing of the main program is suspended and a TDC interrupt sequence 209 is executed:

timing logic 102 is loaded with indicia of the beginning ($\phi 1$) and end ($\phi 2$) of the designated portion of the ram cycle (Step 210);

address generator (counter) 106 is loaded with an appropriate number to establish a beginning address for the BUF array (BUF (0)) (Step 213); and flag TDC is set to one to signify completion of the TDC interrupt routine (Step 214).

A return to the main program is then effected. The TDC wait loop (Step 208) is exited, and the TDC flag is reset to zero in preparation for detection of the next successive ram cycle (Step 216).

It should be appreciated that, if timing logic 101 and address generator 106 are of the type directly reset by the TDC pulses, timing logic 101 and address generator 106 would be preloaded as part of initialization sequence 202, and TDC wait loop 208 and TDC interrupt routine 209 would be omitted.

A signature collection wait loop 218 is then entered (Step 218); the system waits for completion of signature collection. Specifically, an SC flag, indicative of completion of SC interupt routine 219, is repeatedly checked until the SC flag assumes a value of one. Failsafe timers can be included in the loop, if desired.

In response to the SC interrupt, processing of the main program is suspended, and SC interrupt routine 219 executed:

the contents of the BUF array in memory 110 are transferred to an array CURVE in memory 114 (Step 220); and the SC flag is set to signify completion of the routine (Step 221).

A return to the main program is then effected. If desired, the transfer of the signature from the BUF array in memory 110 to the CURVE array in memory 114 (Step 220) can be effected as part of the main program, upon return from interrupt routine 219, rather than as a part of the interrupt routine. The transfer may be effected by generation of appropriate signals to address generator 106 and memory 110 (control lines not shown) or utilizing a conventional direct memory access (DMA) device (not shown).

After return from the SC interrupt routine, the signature collection wait loop 218 is exited and the SC flag is reset (Step 222) in preparation for collection of the next signature.

As will be explained, the reference signature is represented in memory 114 represented by the HI and LO arrays. The HI and LO arrays correspond to the respective sample values of a reference signature offset by high and low tolerance values, respectively. A comparison sequence 224 is then initiated; the signature in the CURVE array is compared on a element-by-element basis to the reference signature:

each element of the CURVE array is subtracted from the corresponding element of the HI array, and the difference loaded into the corresponding element of an array CHEK (Step 226);

each element of CHEK array is then compared against zero (Step 228);

assuming that no negative elements are found in the CHEK array, the individual elements of the LO reference array are subtracted from the corresponding elements of the CURVE array, and overwritten into the corresponding elements of the CHEK array (Step 230); and each element of the CHEK array as then constituted is again compared against zero (Step 232).

If a negative element is found in the CHEK array in either steps 228 or 232, an out-of-tolerance condition is indicated. A display and/or alarm is suitably generated (Step 236). The signature is suitably displayed on a CRT on console 36 with the samples corresponding to deviant CHECK elements highlighted. The signature in the CURVE array and indicia of the CHECK array are also suitably identified and stored in a BAD HIT file in memory 38 for analysis. If a CONTROL mode operation has been selected (Step 233) appropriate control signals are also generated to drive 18, feeder 28 and/or other elements of press 12 through input/output interface 116 in a manner well known in the art (Step 234). The display and/or alarm is maintained (and, if in a CONTROL mode, press 12 is suitably inhibited), as suitably indicated by a "quit" command provided from console 36 (Step 238). If desired, comparison sequence 224 can be implemented as part of SC interrupt routine 219 to prevent external intervention from interfering with timely press shutdown.

Assuming that no out-of-tolerance conditions were detected during execution of the comparison sequence 224, a check is suitably made for a quit command (Step 240) and, assuming no such command has been issued, TDC wait loop 208 is reentered. It should be appreciated that while specific checks for a "quit" command at various points in program 200 are described, it may be desirable to employ an interrupt-based exit scheme as known in the art (e.g., an exit is effected upon a "quit" interrupt).

As previously noted, indicia of the reference signature is initially installed in memory 114 as part of the initialization of the system (Step 204). Referring now to FIG. 3, reference generation sequence 204 will be more fully described. In essence, a reference signature is either generated or obtained from memory, installed in the CURVE array in memory 114, and HI and LO reference arrays generated.

Initial parameters are first established and the source of the reference signature designated. To this end a source option menu is suitably displayed (Step 302). In essence, through prompting, the operator makes appropriate entries through console 36 to, e.g., establish respective tolerance limits LIMHI and LIMLO, indicative of permitted deviation from the elements of the reference signature; and identify the source of the reference signature. For example, the reference signature may be generated on line (captured) or obtained from a reference file in memory 38.

If a capture option is designated (REF OP=CAPTURE) (Step 304), the force signature generated in connection with the next successive ram cycle is adopted (subject to approval) as the reference signature. More specifically, a signature collection sequence 306, essentially identical to the signature collection sequence 206, is effected, resulting in installation of the force signature for the next successive ram cycle in the CURVE array in memory 114. A verification option menu and a prompt sequence is then initiated (Step 308) in accordance with conventional techniques. Responsive to prompts, the operator, presumably after inspection of the results of the ram cycle, i.e., the workpiece, indicates:

that the stamping operation was acceptable and the signature is a suitable reference (VER=GP) (Step 310);

that it is desirable to substitute the signature from the next successive cycle as the reference signature (Step 312), in which case a signature collection sequence 306 is repeated and verification menu and prompt sequence 308 reinitiated; or that an election to cease operation has been made (Step 314).

If desired, the captured reference signature may be saved in the FILE arrays in mass memory 38 for later use. Assuming that acceptance is indicated (VER=GP), an additional prompt is suitably made relating to storing the reference signature (Step 316). If storage is desired, the reference signature is identified (named) for retrieval, and the signature is loaded into the appropriate locations in memory 38 (Step 318). Further elections (not shown) to develop additional reference signatures for storage in memory 38, or to cease operation can be included in prompt sequence 308. Such additional elections facilitate storage of a number of signatures for subsequent analysis in conjunction with the resultant parts.

A prestored reference signature from memory 38 can also be utilized. If a prestored reference mode is designated (REF OP=FILE) (Step 322), the operator identifies the particular referenced signature (the beginning address of the reference file (ADDR) is determined by conventional techniques). If the FILE option is indicated (Step 322), the reference signature beginning at FILE (ADDR) in mass memory 38 is accessed and loaded into the CURVE array in memory 114 (Step 324). After a reference signature has been established in the CURVE array the HI and LO limit arrays are constructed (Step 320):

the tolerance limit entered by the operator, LIMHI, is added to each element of the reference signature in the CURVE array, and the result loaded into the corresponding element of the HI reference array; and the lower deviation tolerance limit, LIMLO, is subtracted from each element of the signature in the CURVE array, and loaded into the corresponding element of the LO array.

A return is then effected to the main program.

In the embodiment of FIGS. 1-3 a single sensor was employed. However, it is sometimes desirable to employ respective sensors, one associated with each support member 26, to aid in ensuring proper balance in installing die 20. If desired, the output from such sensors can be algebraically combined (e.g., added) and applied to A-D converter 108, or may be applied to A-D converter 108 on a time division multiplexed basis.

Likewise, in some instances it may be desirable to sample the force signature independently from the incremental advancement pulses generated by encoder 34. In such case, an encoder 34 which generates an analog signal which varies linearly with the instantaneous phase of the ram cycle, (e.g. an infinite resolution frictionless potentiometer) may be utilized. The analog phase signal may be multiplexed with the sensor signals to A-D converter 108, and the resultant digital phase indicia stored in sequence with the force samples. This, in effect, tags the samples as to corresponding phase; a plurality of locations in BUF array would correspond to each sampling point—a digital representation of the phase of the ram cycle, followed by the data bytes from each of the respective sensors. The reference signature would be similarly constructed, and any deviation in the phase at which the samples are taken detected through comparison sequence 224. Thus, a resolution independent of encoder increments can be established; sampling would be effected in accordance with an independent clock signal. It may be desirable, however, to continue to employ TDC and INC pulses to establish the designated ram cycle portion. Synchronism between analog and digital phase signals may be maintained by mounting a potentiometer for generating the analog phase signal on a common shaft with an incremental encoder for generating the TDC and INC pulses.

Figure 4:
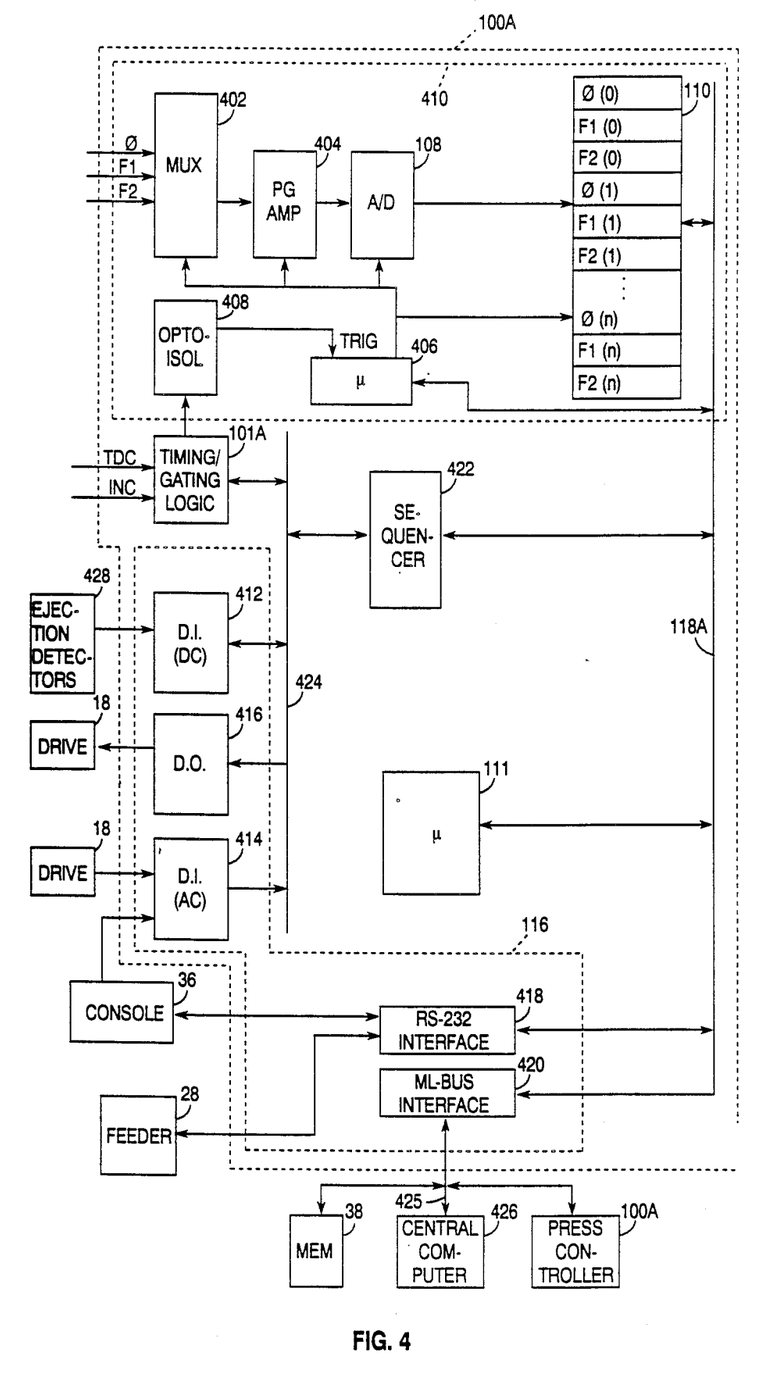
FIG. 4 is a block schematic diagram of a press control system in accordance with the present invention.

Referring now to FIG. 4, another embodiment of a press control system 100A in accordance with the present invention will be described. System 100A is adapted to operate upon TDC and INC pulses and on an analog ram cycle phase signal ($\phi$) from encoder 34 and a plurality of force signals (F1, F2) from sensors disposed, for example, on the respective support members 26 of press 12 (FIG. 1). System 100A further provides for monitoring of various other aspects of the operation of press 12, such as, e.g., parts ejection, feeder operation and sheet metal thickness, and cooperates with a suitable supervisory computer 426.

System 101A suitably comprises: a conventional high-speed analog input device 410; suitable timing/gating logic 101A; a suitable microprocessor 111; a suitable microprogrammed bit-slice processor (sequencer) 422 for high speed execution of sequence tables; and suitable input/output I/0 interfacing devices 116. As will hereinafter be more fully explained, analog input device 410 collects force data (as a function of ram position (phase)) from press 12 in accordance with trigger (timing) signals provided by timing logic 101A. After a force signature has been collected by analog input device 410, the signature is communicated to microprocessor 111 for comparision against a reference signature. The comparison is suitably effected generally in the manner described in conjunction with FIG. 2 (with both data transfer (step 220) and comparison sequence 224 as part of the interrupt routine, as will be explained). Sequencer 422 monitors the status of the stamping operation, as reflected by the various digital status inputs (to interfacing devices 116) and an instantaneous phase (ram position) count maintained in timing logic 101A. In the event of an out-of-tolerance condition determined from analysis of the force signature by microprocessor 111, (a "bad hit") or from the relative status of the digital inputs, appropriate output signals to press 12 and the various external devices are generated through I/O devices 116.

As noted, timing-gating logic 101A provides the trigger signal (and/or timing signals) to microprocessor 406, and maintains indicia of the instantaneous phase of the ram cycle. Timing-gating logic is 101A suitably implemented with a Yokogawa PU1 up/down counter card which comprises a storage register, a counter and a comparator (not shown). The counter is suitably incremented by the incremental advancement and reset by the TDC pulses from encoder 34 to maintain a count indicative of the instantaneous position of ram 14 (sometimes to be referred to as the "phase count" or "position count"). As will be explained, the storage register is loaded with a count indicative of the beginning of the relevant portion of the RAM cycle by microprocessor 111 or supervisory computer 426 (suitably through sequencer 422). The comparator generates a trigger signal to analog input device 410 when the contents of the counter reach the value loaded in the register. (Alternatively, the computer signal can be used to gate INC signals to device 410 as previously described.) The contents of the counter are provided to sequencer 422 as indicia of the instantaneous cycle phase.

High-speed analog input device 410 effects signature data collection. Analog input device 410 suitably comprises a a Yokogawa HAD1 High-Speed Analog Input Card which incorporates analog to digital converter 108 and memory 110 and further includes a multiplexer (MUX) 402, a programmable gain amplifier 404, a microprocessor 406, and optical isolation circuitry 408. The analog ram position signal $\phi$, and the respective force signals F1, F2 are applied to the respective input terminals of MUX 402. The output of MUX 402 is applied through programmable gain amplifier 404 to analog-to-digital converter 108, which, in turn, provides data inputs to memory 110. Timing and control signals are provided by microprocessor 406. The trigger signal, indicative of the beginning of the designated portion of the cycle, is applied through opto-isolators 408 as an interrupt to microprocessor 406. In response to the trigger, microprocessor 406 generates timing and control signals to cause:

Mux 402 to apply the phase signals $\phi$ and force signals F1 and F2 to analog-to-digital converter 108 in sequence;

A-D converter 108 to generate one data byte from each in sequence; and memory 110 to store the resultant data bytes in successive locations in the BUF array.

Thus, for each sampling point (e.g., 0, 1 ... n) indicia of the instantaneous value of the ram cycle phase $\phi$ and each force signal (F1, F2) are installed in sequential locations in memory 110. Where input device 410 comprises a HAD 1 card, MUX 402 provides 16 input channels. Microprocessor 406 may be programmed (e.g., from supervisory computer 426 or microprocessor 111) to determine the number of input channels (steps) grouped in a repetitive scan (e.g., 3 in the example above) the order in which the individual channels are accessed (e.g., $\phi$, F1, F2; the number of scans (samples) made in response to the trigger signal, as well as the time periods between input channel readings (steps) and between successive scans of the input channels. In addition to the mode of operation described above (the trigger mode) microprocessor 406 may alternatively be programmed to respond to gated INC signals from timing logic 101A, to effect a single scan of the respective input channels in response to each INC signal, or to effect a single channel reading (step) in response to each INC signal. In these cases, analog phase signal ($\phi$) can be omitted.

When a predetermined number of readings have been taken, an appropriate signal (e.g., the SC interrupt) is generated by microprocessor 406 to microprocessor 111 to signify completion of the signature collection process. Microprocessor 111 is suitably implemented with a conventional microprocessor, e.g., a Yokogawa NP22*A or NP21*B processor employing an MC68000 central processing unit, a 16 KB read-only memory, and a 512 KB random-access memory. In response to the SC interrupt, microproecessor 111 loads the signature into the curve array and effects a comparision sequence generally in the manner previously described. If an out-of-tolerance condition is detected, a signal is generated to sequencer 422 for communication to I/O devices 416.

System 100A interfaces with external devices through I/O devices 116. I/O devices 116 suitably include digital input interfaces for monitoring the operational status of the press system:

an opto-isolated DC interface 412 suitable for monitoring DC voltage on/off input signals, e.g. a Yokogawa DC1 multipoint DC input card; and an opto-isolated digital input interface 414 suitable for monitoring alternating current voltage on/off input signals, e.g., a Yokogawa AC1 multipoint A/C input card.

Digital input interface (DI) 412 suitably receives signals from respective detectors 428. Detectors 428 may be Piezo-electric sensors, proximity detectors, limit switches, or the like, disposed on press 12 and die 20 to monitor progression of the stamping operation. Digital input interface (DI) 414 similarly monitors the status of external devices such as drive 18, and console 36 and feeder 28 as reflected by the presence or absence of an AC signal.

I/O devices 116 also include a suitable digital output interface (DO) 416 to provide on/off control signals to external devices, such as, e.g., a clutch solenoid associated with drive 18, feeder 28, and console 36 Digital output interface circuitry 416 suitably comprises a Yokogawa RLO multipoint relay output card. I/O devices 116 may include suitable RS232, interface 418 and ML Bus interface 420 to provide interactive communication between system 100A and external devices. RS232 interface 418 is suitably a Yokogawa RS2 multipoint RS232-C interface card and effects communications with console 36 and feeder 28. ML bus interface 420 suitably comprises a Yokogawa NC21*B ML bus communications card, and couples system 100A to a conventional ML bus 425, and therethrough to external memory 38, a central supervisory computer 426, and other press controller systems 100A.

Intercommunication in System 101A is effected employing conventional buses; an NI bus 118A; and an SQ bus 424. NI bus 118A provides selective communications between microprocessor 406 and memory 110 in high-speed analog input card 410, sequencer 422, microprocessor 111 and communication's interface cards 418 and 420. SQ Bus 424 couples sequencer 422 to timing-gating logic 101A, and digital I/O devices 412, 414 and 416. In practice, buses 118A and 424 are effected using the backplane of system 100A, and particularly in the case of SQ Bus 424 may comprise direct from device connections to various registers or memory locations in sequencer 422.

Sequencer 422 is employed to monitor the status of the stamping operation, and generate alarms or disable press 12 upon detection of deviant conditions. Sequencer 422 is suitably implemented with a Yokogawa SQ2 sequencer card, comprising a bit-slice microprocessor (2900 series), a 56-bit by 2K word read-only memory maintaining a sequence control program, and a 16-bit by 32K word random-access memory. Sequencer 422 suitably includes respective addressable effective memory locations (e.g., registers or input/output slots) corresponding to each of DI interfaces 412 and 414, the instantaneous ram position counter in timing logic 101A, and D. O. interface 416. The effective memory locations may be directly connected to the corresponding elements through SQ bus 424. In effect, sequencer 422 monitors the status of the various digital input signals reflecting the condition (on/off) of the respective detectors and equipment relative to the instantaneous ram position (phase) and cyclically effects a sequence of combinatorial logic operations to compare the actual (instantaneous) status of the input signals to expected condition at the respective phases of the ram cycle as reflected in a sequence table preprogrammed in the sequencer random-access memory. The sequence table is suitably constructed in supervisory computer 426 using conventional builder/maintenance functions associated with sequencer 422 and downloaded into memory in sequencer 422. If the actual conditions deviate from the desired conditions, appropriate output signals, also specified in the sequence table are generated (through D. O. interface 416) to e.g., disable press 12.

Central computer 426 may be provided to supervise a plurality of control systems 100A (and thus a plurality of presses 12). Communications between line computer 426 and the individual press controllers is suitably effected through ML bus 425.

Central supervisory computer 426 suitably includes an MC68000 central processing unit, a 16 KB read-only memory, a MB random-access memory, appropriate communications, printer and display interface circuitry, and 20 MB fixed-disc and 1 MB floppy-disc secondary memory. Such secondary memory may be used to implement mass memory 38. Central supervisory computer 426 may be implemented with conventional minicomputer, such as a Yokogawa M3230A YEWMAC 300 line computer.

Figure 5:
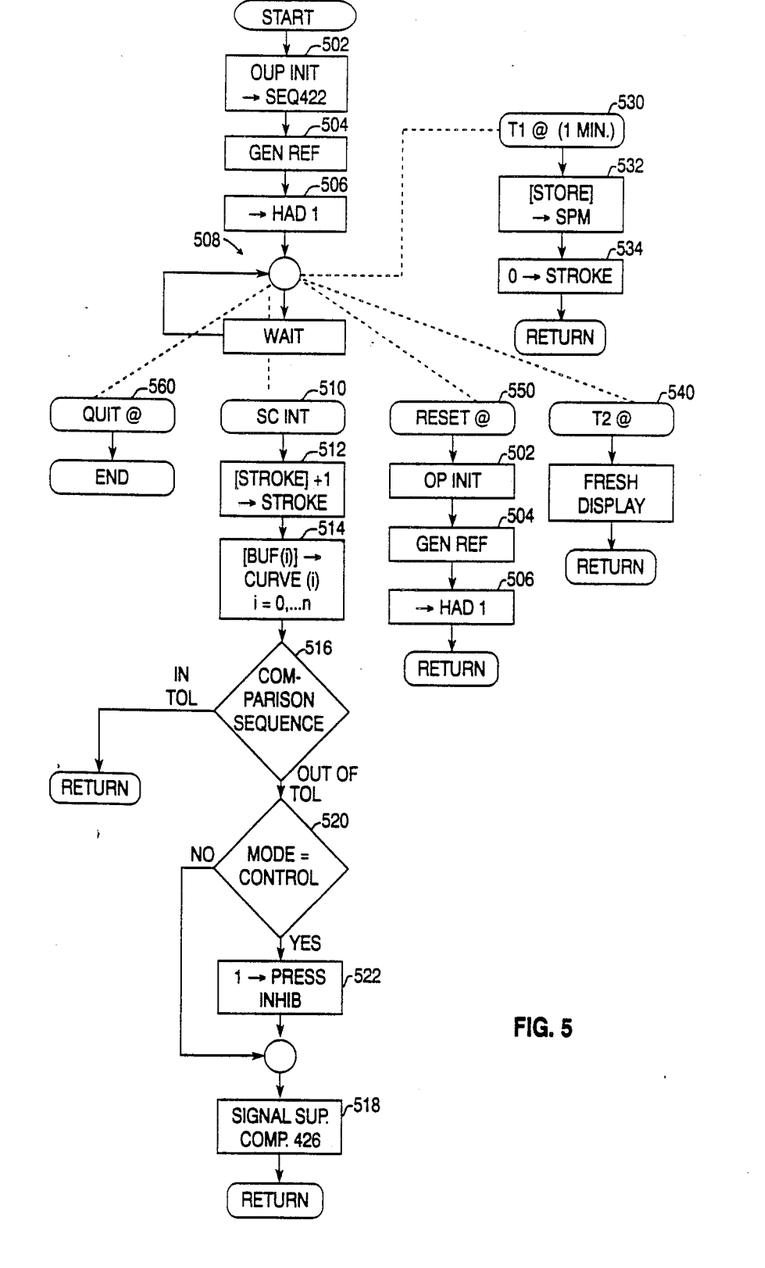
FIG. 5 is a flow chart in accordance with the present invention.

Referring now to FIG. 5 microprocessor 111 upon startup, executes an initialization sequence 502 similar to sequence 202. During initialization, various parameters are established by operator entries, or by downloading from supervisory computer 426 and the operational mode, (monitor or control) of the system is established. To facilitate downloading, various portions of the random access memory associated with microprocessor 111 are made directly accessable to supervisory computer 426 (are defined as common). During the initialization sequence, a count, indicative of the beginning of the relevant portion of the ram cycle is communicated to sequencer 422 for looking into the storage register in timing gating logic 101A. Likewise, the sequence table reflecting the desired process conditions relative to ram position is also loaded into sequencer 422.

A reference generation step 504, analogous to step 204, is then effected. The hi and low arrays may be generated on line as described in connection with sequence 204, or may be downloaded from supervisory computer 426.

The microprocessor 406 in analog input device 410 is then provided with configuration parameters (e.g., the number of channels, steps per scan, the number of scans per trigger, and timing information) and is enabled (step 506).

Microprocessor 111 then enters an interrupt-driven mode of operation; a wait loop, generally indicated as 508, is entered, and the response is made to various predefined interrupts. Specifically, various interrupts are defined: the SC interrupt from analog input device 410, indicative of a complete signature collection; RESET and QUIT interrupts provided from either supervisory computer 406 or operator console 36; and respective timer interrupts, T1 and T2, periodically generated by internal timers.

In response to a SC interrupt, microprocessor 111 performs a signature analysis sequence 510 on a priority basis, and generates alarms and selectively stops press 12 in the event of an out-of-tolerance condition. More specifically, in response to the SC interrupt, a count stroke, utilized to monitor press speed, as will be explained, is incremented (step 512). The force signature in memory 110 of analog input device 410 is then transferred as in step 220 to the CURVE array in microprocessor 111 (step 514). A comparison sequence 516 analogous to sequence 224, is then executed. If the signature is within tolerance, a return to the wait loop is effected. If, however, an out-of-tolerance condition is detected, the condition is communicated to supervisory computer 426 (step 518) and, if the control mode has been selected (step 520), a signal is output to sequencer 422 (the effective memory location in sequencer 422 corresponding to the control signal to drive 18 of press 12 (FIG. 1) is addressed to stop press 12 (step 522)). After supervisory computer 426 is signalled, a return to the wait loop is effected. The signals to supervisory computer 426 may cause supervisory computer 426 to transfer the CURVE array and CHEK array to a designated bad hit file in mass memory 38. Further, if desired, the maximum and minimum values of the signature can be computed in comparison sequence 516 and communicated to supervisory computer 426. Supervisory computer 426 also suitably generates alarm and suitable messages at console 36.

In response to the T1 interrupt, a sequence 530 is executed to calculate the speed of press 12 (strokes per minute). The T1 interrupt is generated by an internal timer at one minute intervals. As previously noted, a count stroke is maintained (step 512) indicative of the number of SC interrupts, i.e. the number of strokes by ram 14 (FIG. 1). In response to the T1 interrupt, the contents of the stroke register are transferred into a strokes per minutes register (SPM) (step 532), and the stroke count set to zero in preparation for the next speed measurement (step 534). A return to the wait loop is then effected.

In response to the T2 interrupt, a display refresh sequence 540 is effected. The T2 interrupt is generated on a periodic basis by an internal timer. In response to the T2 interrupt, the current signature in the curve array and the offset reference signatures in the high and low arrays are communicated to console 36 through RS232 interface 418. The signature and tolerance offsets are suitably displayed on operator console 36. In addition, the press speed (SPM) and minimum and maximum force values (if computed) may also be selectively communicated to the operator console to display, as well as the values of various parameters.

The RESET interrupt is generated from operator console 36 or supervisory computer 426 when it is desired to change system parameters or operational modes. In response to the reset interrupt, a reinitialization sequence 550 is executed. Specifically, initialization sequence 502, reference generation sequence 504, and analog input device initialization sequence 506 are reexecuted, then a return to the wait loop effected.

The program is ended by generation of the QUIT interrupt (step 560) from supervisory computer 426 or operator console 36.

While microprocessor 111 executes the wait loop and responds to the various interrupts, sequencer 422 monitors the various digital inputs and the phase count in timing logic 101A and continously cycles through the sequence table to detect deviant operating conditions.

It would be understood that while various of the conductors (connections) are shown in the drawing as single lines, they are not so shown in a limiting sense, and may comprise plural conductors (connections), as is understood in the art. Further, the above description is of preferred exemplary embodiments of the present invention, and the invention is not limited to the specific forms shown. Modifications may be made in the design and arrangement of the elements within the scope of the invention, as expressed in the appended claims.

I claim:

1. A method for controlling the operation of a stamping press, said press including a ram adapted to cooperate with a tool for controllably moving through a cycle to generate forces at said tool, the method comprising the steps of:

generating from the drive system of the press, a position signal comprising pulses indicative of a specific angular position of the drive system for said ram during a cycle;

generating a first analog signal indicative of a force associated with said ram;

sampling said first analog signal in response to the pulses of the position signal during a reference ram cycle, and generating a signature array of successive data bytes indicative of instantaneous values of said force and associated position;

generating a first reference array comprising a set of data bytes, by adding a first set of offset values to said successive data bytes of said signature array;

generating a second reference array comprising a set of data bytes, by subtracting a second set of offset values from successive data bytes of said signature array;

storing said first and second reference arrays;

sampling said first analog signal in response to the pulses of the position signal during a subsequent ram cycle, and generating a current signature array of successive data bytes indicative of instantaneous values of said force and associated position;

comparing the respective bytes of said current signature array with the corresponding bytes of said first and second reference arrays; and generating control signals for controlling said press in accordance with said comparison.

2. The method as claimed in claim 1, further including the steps of providing a trigger signal based on the progression of said stamping press past a definable point in the cycle, and initiating the acquisition of said first analog signal based on said trigger signal.

3. The method as claimed in claim 1, further including the steps of generating a position signal based on the progression of said stamping press past a definable point in the cycle, and terminating the acquisition of said first analog signal based on said position signal.

4. The method as claimed in claim 1, further comprising the steps of permanently storing said aperture array and said first and second reference arrays in a mass storage area when data bytes of the said current signal array are found to deviate unacceptably from the corresponding data bytes in said reference arrays based on said comparison; and retrieving and displaying the stored signature array and said first and second reference arrays on a console for inspection.

5. The method of claim 1, wherein the first set of offset values equals the second set of offset values.

6. The method as claimed in claim 1, wherein the values in the first set of offset values are equal, and the values in the second set of offset values are equal.

7. A method for controlling the operation of a stamping press for a plurality of different stamping operations, said press including a drive system for cycling a ram adapted to cooperate with a tool for controllably moving through a cycle to generate forces at said tool, the method comprising the steps of:

generating a position signal from the drive system of said press comprising pulses indicative of specific incremental changes in angular position of the drive system during a cycle;

generating a first analog signal indicative of a force associated with said ram;

sampling said first analog signals in response to the pules of the position signal during a reference ram cycle for each of the plurality of different stamping operations, and generating a respective signature array of successive data bytes indicative of instantaneous values of said force and associated position for each of the plurality of different stamping operations;

generating a first reference array comprising a set of data bytes for each of the plurality of different stamping operations, by adding a first set of offset values to said successive data bytes of said respective signature arrays;

generating a second reference array comprising a set of data bytes for each of the plurality of different stamping operations, by subtracting a second set of offset values from said successive data bytes of said respective signature arrays;

storing said first and second reference arrays in a first means for data storage;

transferring one of said first and second reference arrays for a particular one of the plurality of different stamping operations from the first data storage means to a second means for data storage;

sampling said first analog signal in response to the pulses of the position signal during a subsequent ram cycle for the particular stamping operation, and generating a current signature array of successive data bytes indicative of instantaneous values of said force and associated position;

comparing the respective bytes of said current signature array with the corresponding bytes of said first and second reference arrays for the particular stamping operation; and generating control signals for controlling said press in accordance with said comparison.

8. The method as claimed in claim 7, further including the steps of providing a trigger signal based on the progression of said stamping press past a definable point in the cycle, and initiating the acquisition of said first analog signal based on said trigger signal.

9. The method as claimed in claim 7, further including the steps of generating a position signal based on the progression of said stamping press past a definable point in the cycle, and terminating the acquisition of said first analog signal based on said position signal.

10. The method of claim 7, wherein the first set of offset values equal the second set of offset values.

11. The method of claim 7, wherein the values in the first set of offset values are equal, and the values in the second set of offset values are equal.

12. An apparatus for controlling the operation of a stamping press, said press including a ram adapted to cooperate with a tool for controlling moving through a cycle to generate forces at said tool, said apparatus comprising:

means for generating from the drive system of said press, a position signal comprising pulses indicative of a specific angular position of the drive system for said ram during a cycle;

signal means for generating a first analog signal indicative of a force associated with said ram;

sampling means for sampling said first analog signal in response to the pulses of the position signal during a reference ram cycle, and generating a signature array of successive data bytes indicative of instantaneous values of said force and associated position;

processing means for generating first and second reference arrays of data bytes, wherein the data bytes of said first reference array are indicative of said successive data bytes of said signature array having a first set of offset values added thereto and the data bytes of said second reference array are indicative of said successive data bytes of said signature array having a second set of offset values subtracted therefrom;

storing means for storing said first and second reference arrays;

said sampling means also sampling said first analog signal in response to the pulses of the position signal during a subsequent ram cycle, and generating a current signature array of successive data bytes indicative of instantaneous values of said force and associated position;

comparison means for comparing the respective data bytes of said current signature array with the corresponding data bytes of said first and second reference arrays; and control generating control signals for controlling said press in accordance with said comparison.

13. An apparatus as claimed in claim 12, further comprising signal means for generating a trigger signal based on the progression of said stamping press past a definable point in the cycle, wherein said signal means initiates the acquisition of said first analog signal in response to said trigger signal.

14. An apparatus as claimed in claim 12, further comprising signal means for generating a position signal based on the progression of said stamping press past a definable point in the cycle, wherein said signal means terminates the acquisition of said first analog signal in response to said position signal.

15. An apparatus as claimed in claim 12, further comprising a drive mechanism for moving the ram through the cycle, wherein:

the means for generating a position signal includes an encoder coupled to the drive mechanism for generating a series of pulses, each pulse corresponding to an incremental change in position of the ram;

the sampling means includes an analog-to-digital convertor; and the encoder is coupled to the analog-to-digital convertor such that one occurs in response to one pulse of the position signal.

16. The apparatus as claimed in claim 12, wherein the first set of offset values equals the second set of offset values.

17. The apparatus of claim 12, wherein the values in the first set of offset values are equal, and the values in the second set of offset values are equal.

18. An apparatus for controlling the operation of a stamping press for a plurality of different stamping operations, said press including a drive system for cycling a ram adapted to cooperate with a tool for controllably moving through a cycle to generate forces at said tool, the apparatus comprising:

means for generating a position signal from the drive system of said press comprising pulses indicative of specific incremental changes in angular position of the drive system during a cycle;

signal means for generating a first analog signal indicative of a force associated with said ram;

sampling means for sampling said first analog signals in response to the pules of the position signal during a reference ram cycle for each of the plurality of different stamping operations, and generating a respective signature array of successive data bytes indicative of instantaneous values of said force and associated position for each of the plurality of different stamping operations;

processing means for generating a first reference array comprising a set of data bytes for each of the plurality of different stamping operations, by adding a first set of offset values to said successive data bytes of said respective signature arrays;

processing means for generating a second reference array comprising a set of data bytes for each of the plurality of different stamping operations, by subtracting a second set of offset values from said successive data bytes of said respective signature arrays;

storing means storing said first and second reference arrays in a first means for data storage;

processing means for transferring one of said first and second reference arrays for a particular one of the plurality of different stamping operations from the first data storage means to a second means for data storage;

sampling means for sampling said first analog signal in response to the pulses of the position signal during a subsequent ram cycle for the particular stamping operation, and generating a current signature array of successive data bytes indicative of instantaneous values of said first and associated position;

comparison means for comparing the respective bytes of said current signature array with the corresponding bytes of said first and second reference arrays for the particular stamping operation; and control means for generating control signals for controlling said press in accordance with said comparison.

19. An apparatus as claimed in claim 18, further comprising means for generating a trigger signal based on the progression of said stamping press past a definable point in the cycle, wherein said signal means initiates the acquisition of said first analog signal in response to said trigger signal.

20. An apparatus as claimed in claim 18, further comprising means for generating a position signal based on the progression of said stamping press past a definable point in the cycle, wherein said signal means terminates the acquisition of said first analog signal in response to said position signal.

21. The apparatus of claim 18, wherein the first set of offset values equals the second set of offset values.

22. The apparatus of claim 18, wherein the values in the first set of offset values are equal, and the values in the second set of offset values are equal.

* * * * *